(12) United States Patent
Casas Alvarez (10) Patent No.: US 10,737,913 B2
(45) Date of Patent: Aug. 11, 2020

(54) ANCHOR ASSEMBLY

(71) Applicant: Juan Casas Alvarez, Barcelona (ES)

(72) Inventor: Juan Casas Alvarez, Barcelona (ES)

( * ) Notice: Subject to any disclaimer, the term of this patent is extended or adjusted under 35 U.S.C. 154(b) by 0 days.

(21) Appl. No.: 16/312,243

(22) PCT Filed: Jun. 20, 2017

(86) PCT No.: PCT/ES2017/070446
§ 371 (c)(1),
(2) Date: Dec. 20, 2018

(87) PCT Pub. No.: WO2017/220837
PCT Pub. Date: Dec. 28, 2017

(65) Prior Publication Data
US 2019/0233256 A1    Aug. 1, 2019

(30) Foreign Application Priority Data
Jun. 20, 2016   (ES) .................................. 201630833

(51) Int. Cl.
| | | |
|---|---|---|
| *B66C 1/66* | (2006.01) | |
| *F16B 45/06* | (2006.01) | |
| *F16B 41/00* | (2006.01) | |
| *E04G 5/04* | (2006.01) | |
| *F16B 45/00* | (2006.01) | |

(52) U.S. Cl.
CPC ................ *B66C 1/66* (2013.01); *B66C 1/666* (2013.01); *E04G 5/04* (2013.01); *F16B 41/00* (2013.01); *F16B 45/00* (2013.01); *F16B 45/06* (2013.01)

(58) Field of Classification Search
CPC ........... B66C 1/166; F16B 41/00; F16B 45/06
USPC .............................. 294/97, 117, 93; 52/125.5
See application file for complete search history.

(56) References Cited

U.S. PATENT DOCUMENTS

| | | | | |
|---|---|---|---|---|
| 1,023,148 | A * | 4/1912 | Hartman ................... | A22B 5/06 452/189 |
| 1,367,044 | A * | 2/1921 | Hausler ..................... | B66C 1/66 294/106 |
| D152,478 | S * | 1/1949 | Hutchinson et al. ........ | D22/150 |
| 2,832,633 | A * | 4/1958 | Compson .................. | B66C 1/54 294/97 |
| 4,300,382 | A * | 11/1981 | Meek ....................... | B21D 1/06 72/478 |
| 4,417,713 | A | 11/1983 | Snowden | |
| 4,423,610 | A * | 1/1984 | Hart ........................ | F16B 41/00 70/14 |
| 5,103,755 | A | 4/1992 | Garrett | |

(Continued)

FOREIGN PATENT DOCUMENTS

| | | |
|---|---|---|
| ES | 2394246 | 1/2013 |
| FR | 2752232 | 2/1998 |

(Continued)

*Primary Examiner* — Paul T Chin
(74) *Attorney, Agent, or Firm* — Jason Lee DeFrancesco (57) ABSTRACT

An anchor assembly (1) that has two hooks (2, 3) pivotably connected by a rotary shaft (4). A distal end of each hook has a tooth (21, 31) and the other end, a slot (22, 32). The assembly has an insertion configuration (P1) where hooks (2, 3) are superposed, and a securing configuration (P2) where teeth (21, 31) are separated whereby hooks (2, 3) project to remain retained in an inner support surface (51).

10 Claims, 11 Drawing Sheets (56) References Cited

U.S. PATENT DOCUMENTS

| | | | | |
|---|---|---|---|---|
| 7,669,905 B1* | 3/2010 | Kondo | ............... | B66C 1/54 |
| | | | | 294/117 |
| 8,201,865 B2* | 6/2012 | Hoopman | ............ | B66C 1/56 |
| | | | | 294/902 |
| 8,562,048 B2* | 10/2013 | Cronian | ............ | B66C 1/66 |
| | | | | 294/97 |
| 8,814,240 B2* | 8/2014 | Hedley | ............ | B66C 1/66 |
| | | | | 294/97 |
| 2011/0175383 A1 | 7/2011 | Segura | | |
| 2014/0125074 A1* | 5/2014 | Vaz Coelho | ......... | B66C 1/66 |
| | | | | 294/82.11 |

FOREIGN PATENT DOCUMENTS

| | | |
|---|---|---|
| GB | 395835 | 7/1933 |
| GB | 1435689 | 5/1976 |
| WO | PCT/ES2012/070342 | 11/2012 |

* cited by examiner

ANCHOR ASSEMBLY

OBJECT OF THE INVENTION

The object of the present invention is a embeddable security anchor, of the type of those intended to be installed in a wall or structural element to form a secure point for hooking lifelines or cables, safety harnesses, elements for lifting or securing loads and in general for the safe hold of any kind of load.

BACKGROUND OF THE INVENTION

In the construction field, anchor points for hooking safety elements, personal protection or fastening loads are commonly installed on either a temporary or permanent basis.

The most common anchors are formed by rings joined to a support base or plate, which is fixed to an existing construction by means of different kinds of screws and plugs, such as expansion plugs, chemical plugs, etc.

In addition to requiring holes to be made in the support surface, the installation of these kinds of anchors is long and laborious and requires additional elements to be used, such as the above-mentioned fastening plugs and screws.

When the anchor is going to be used for a limited period of time, for example for carrying out repair or maintenance works, it is common to subsequently dismount it in order to reuse it in later works. However, when one wishes to install an anchor permanently, for example to carry out periodic tasks, it is essential that the entire anchor remains fixed to the support surface, which may incur significant costs and lead to an aesthetic modification of the construction when a high number of anchoring points exist.

To overcome these drawbacks, there is already known a scissor-type securing element, comprising two hooks pivotably connected together by a rotary shaft, a distal part being defined in each hook on one side of the shaft and a proximal part being defined on the other side of the shaft, the distal parts being intended to be introduced in a case embedded in a structure, each distal part being provided with a tooth and each proximal part being provided with a penetrating slot, in which an insertion configuration is defined, in which the hooks are superposed and a securing configuration in which the teeth are in a more separated position and the hooks project so as to remain retained in an inner support surface of the case, the slots being arranged so that in the insertion configuration the ends of the slots closest to the shaft overlap and in the securing configuration the ends of the slots furthest from the shaft overlap, in which the securing element comprises a shackle, the shackle being provided with a ring for supporting the load, two ring ends and a key supported by the two ends and inserted into the slots.

The inventor himself developed such an anchor described in the international application PCT/ES2012/070342.

Some characteristics of these anchors are described in GB 1 435 689 A, GB 2 307 942 A, DE 203 17 251 U1, GB 395 835 A, JP S51 60700 U, and JP S51 51700 U.

The present invention aims to provide new functions to this type of anchors.

In particular, it has, among others, the following aims:
Facilitating the handling of the securing element prior to its securing in the case arranged in the wall;
Providing an securing element, already provided with a ring for securing the loads; and
Improving the procedure of placing the case associated with the securing assembly.

DESCRIPTION OF THE INVENTION

To overcome the shortcomings of the state of the art, the present invention proposes a scissor-type securing element, comprising two hooks pivotably connected together by a rotary shaft, a distal part being defined in each hook on one side of the shaft and a proximal part being defined on the other side of the shaft, the distal parts being intended to be introduced in a case embedded in a structure, each distal part being provided with a tooth and each proximal part being provided with a penetrating slot, in which an insertion configuration is defined, in which the hooks are superposed and a securing configuration in which the teeth are in a more separated position and the hooks project so as to remain retained in an inner support surface of the case, the slots being arranged so that in the insertion configuration the ends of the slots closest to the shaft overlap and in the securing configuration the ends of the slots furthest from the shaft overlap, in which the securing element comprises a shackle, the shackle being provided with a ring for supporting the load, two ring ends and a key supported by the two ends and inserted into the slots, in which the ends of the shaft project laterally and the ring ends are provided with a housing having a form complementary to the ends of the shaft, such that in the insertion configuration, each of the ends of the shaft is inserted into a housing.

This structure allows in the insertion configuration, to fit the ends of the shaft in the housings of the ends or ears of the ring, to prevent the rotation of the shackle in relation to the hooks that constitute the securing element, so that it results in a single piece with no moving parts, which facilitates its handling for insertion. When passing to the securing position, the ends of the pins leave the housings and then the rotation of the shackle in relation to the hooks is allowed. That is, in the securing position, these can no longer rotate with each other, but the shackle can do so, and be oriented in the direction of the applied forces. In addition, in most work positions it is necessary to rotate the shackle to allow sliding of the shackle key to be able to move to the insertion configuration, which is also a removal position. This is because the shackle can only be directed towards the removal position if the ends of the pins face the housings.

Another advantage is that, since the shackle is part of the securing element, it is already dimensioned to fit perfectly in the slots, which does not happen with other devices of the state of the art in which an added shackle is used for its insertion into the slots.

In some embodiments, the ends of the slots furthest from the shaft are provided on their inner surface with a frangible element.

This frangible element constitutes an indicator, which must be dimensioned according to the maximum permissible load, according to the longitudinal direction, of the securing element.

In some embodiments, the frangible member is a tab attached at its ends to the internal walls of the slot end or a protruding attachment disposed at the end of the slot.

These are easily moldable simple shapes.

In some embodiments, the shackle ring is disposed in an oblique plane to the general plane of the securing element, so that the joints between the ring and the ring ends are made on an upper side of the key on opposite sides thereof.

In this way, maximum ring dimensions are achieved for a minimum use of space of the securing element.

In some embodiments, the securing element is symmetrical with regard to its longitudinal direction.

The invention also proposes a embeddable security anchor assembly of the type intended to be fixed to a wall or structural element to form a secure point for hooking lifelines, safety harnesses, elements for lifting or securing loads and in general for the safe hold of any kind of load, the securing assembly being provided with an securing element according to any of the variants of the anchor object of the invention described above, and a case embedded in a structure, and further comprising a positioning disk, the positioning disk being provided with first removable attachment means to the inner side of the mold of the wall formwork and with second removable attachment means to the case.

This structure allows the placement with great precision, in a very simple way and with reduced costs, of the case in the wall, and in particular to improve the quality of the anchor.

In some embodiments, the case is elongated, its cross section is rectangular, its distal part comprises at least two side widening, its proximal part comprises an outer mouth complementary to the positioning disc and third removable attachment means complementary to the second attachment means of the positioning disc.

In some embodiments, each of the hooks comprises teeth at different levels, so that different securing levels are defined.

DESCRIPTION OF THE FIGURES

In order to complement the description and with the aim of helping to a better understanding of the characteristics of the invention, according to an exemplary practical embodiment thereof, an set of figures is attached as an integral part of the description, in which with an illustrative and non-limiting character, the following has been represented.

PREFERRED EMBODIMENTS OF THE INVENTION

As shown in the figures, the present invention relates to a scissor-type securing element 1, comprising two hooks 2, 3 pivotably connected together by a rotary shaft 4.

Figure 1:
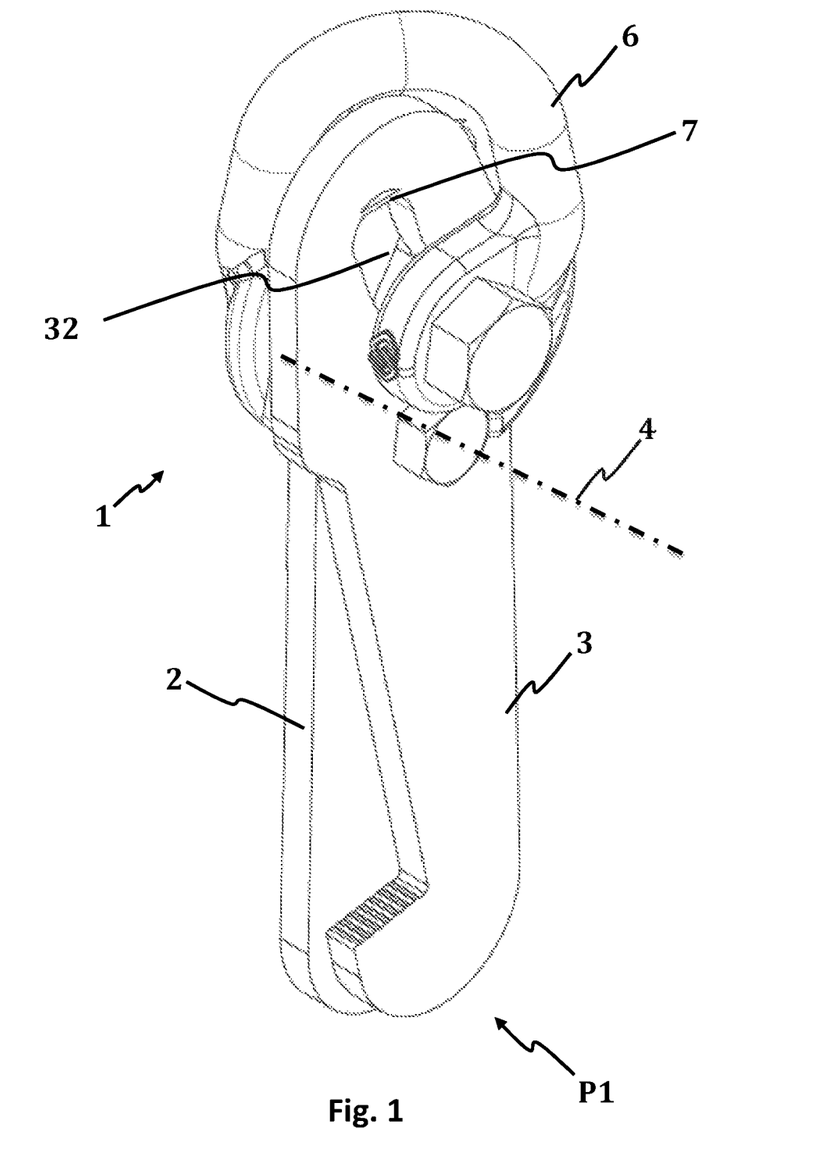
FIG. 1 shows the securing element of the invention in its introduction configuration.
Figure 2:
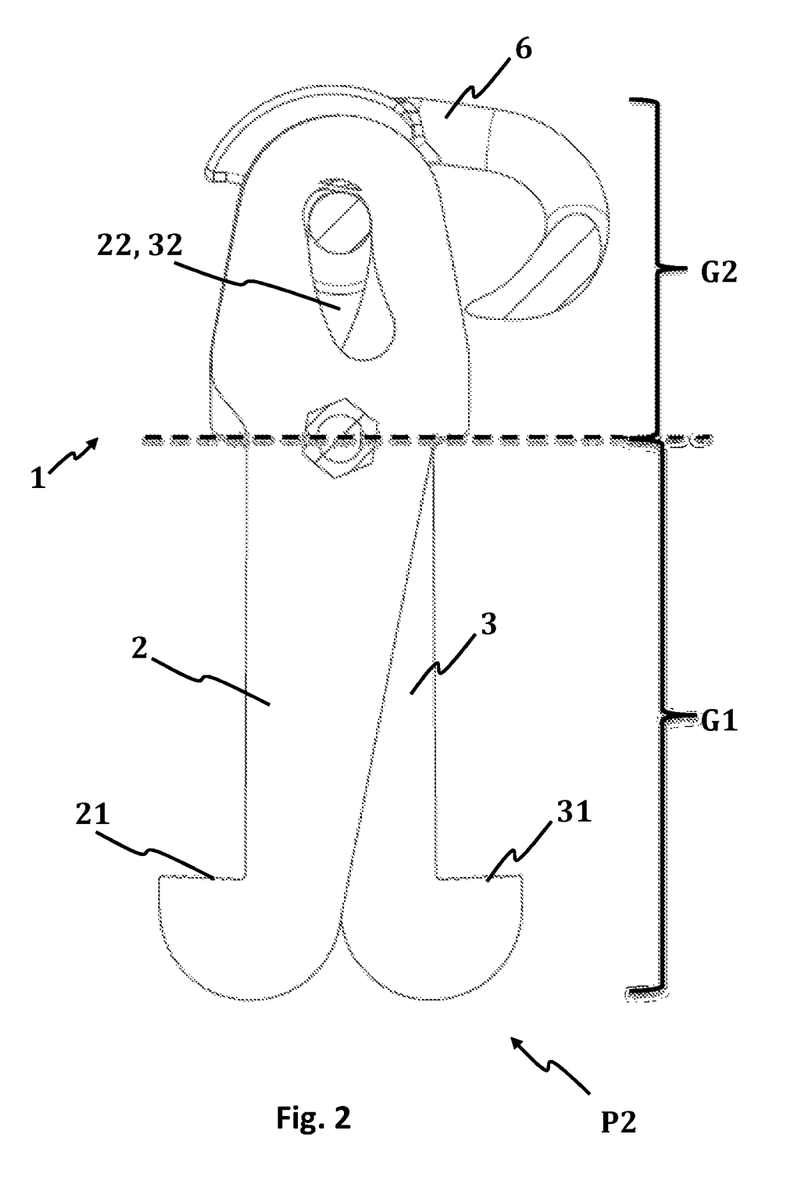
FIG. 2 shows in elevation the securing element in the securing configuration, with the shafts of the hooks forming an angle and the rotating shackle.

In the embodiment of FIG. 1, the hooks are metal, elongated plates with rounded ends, so that they have an oblong outline. The two hooks have the same shape, so that when overlapping, their envelope coincides.

In each hook 2, 3, a distal part G1 is defined on one side of the shaft 4, and a proximal part G2 is defined on the other side of the shaft 4.

The distal parts, which are rounded, are intended to be inserted in a case 5 embedded in a structure E.

Each distal part G1 is provided with a tooth 21, 31 and each proximal part with a penetrating slot 22, 32.

The grooves are elongated, preferably arched, with rounded ends. Another way to describe them is like slotted holes.

Figure 17:
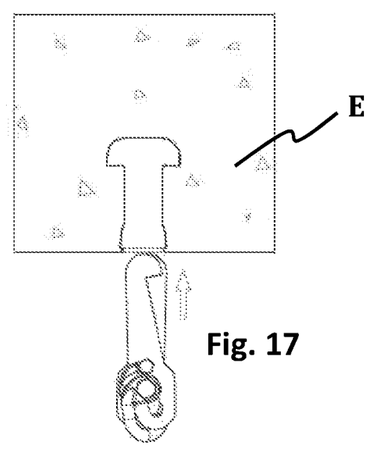
Figure 18:
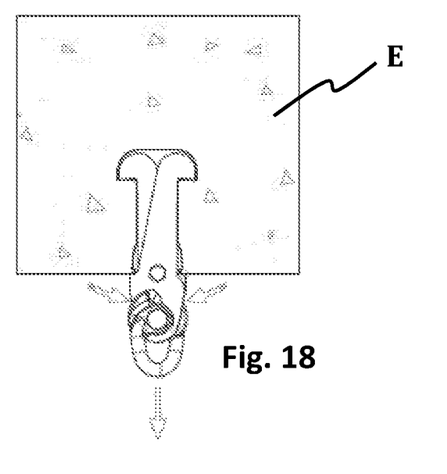
Figure 19:
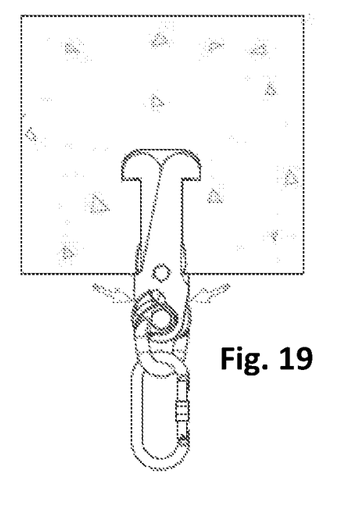
Figure 20:
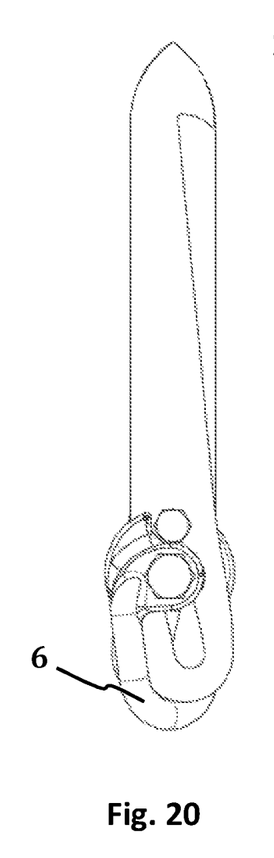
FIGS. 20 to 23 show an embodiment of the securing element intended for its securing in the ground.
Figure 21:
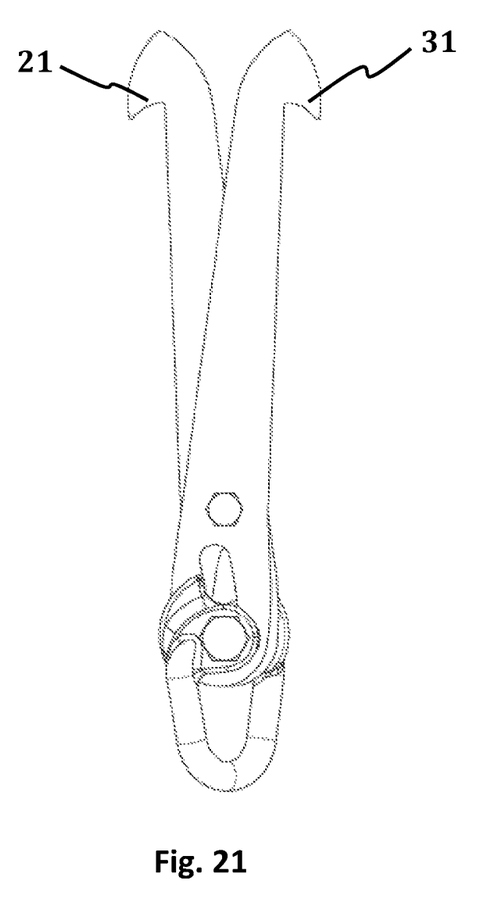
Figure 22:
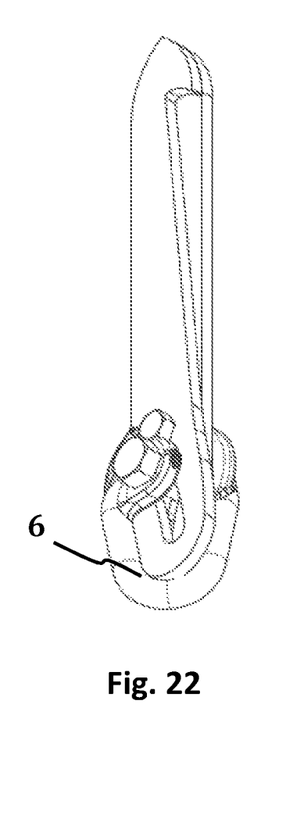
Figure 23:
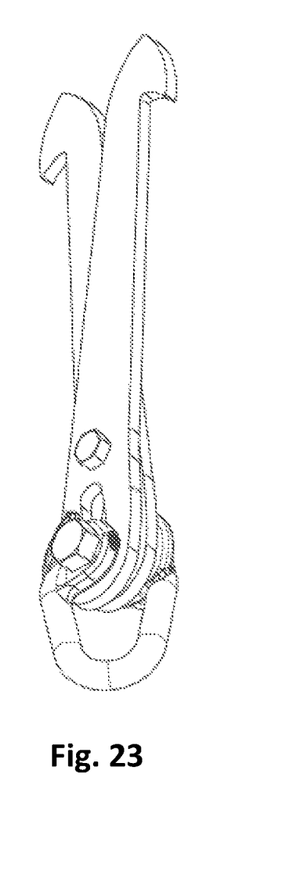
Figure 24:
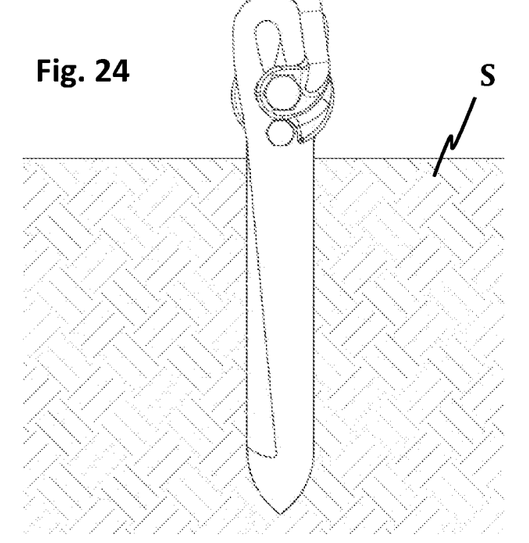
FIGS. 24 and 25 show the insertion and securing method of the specific embodiment for the floor.
Figure 25:
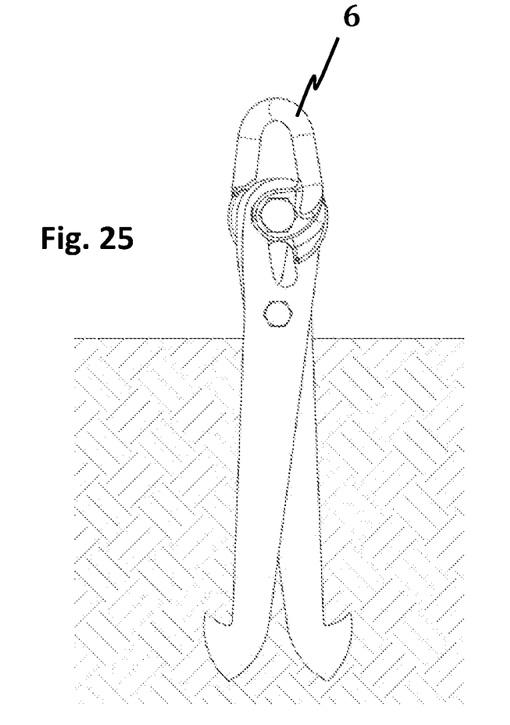

In this way, an insertion configuration P1 is defined, as shown in FIGS. 1, 17 and 20, in which the hooks 2, 3 overlap and an securing configuration P2, shown for example in FIGS. 2, 3, 18, 19, 21 and 25, in which the teeth 21, 31 are in a more separated position and the hooks 2, 3 protrude to be retained on an inner support surface 51 of the case 5.

The slots 22, 32 are arranged so that in the insertion configuration the ends of the slots 22, 32 closest to the shaft 4 overlap and in the securing configuration the ends of the slots 22, 32 furthest from the axis 4 overlap.

The securing element 1 comprises a shackle 6, which is provided with a ring 61 for supporting the load, two ring ends 62, 63 and a key 64 supported by the two ends 62, 63.

Figure 3:
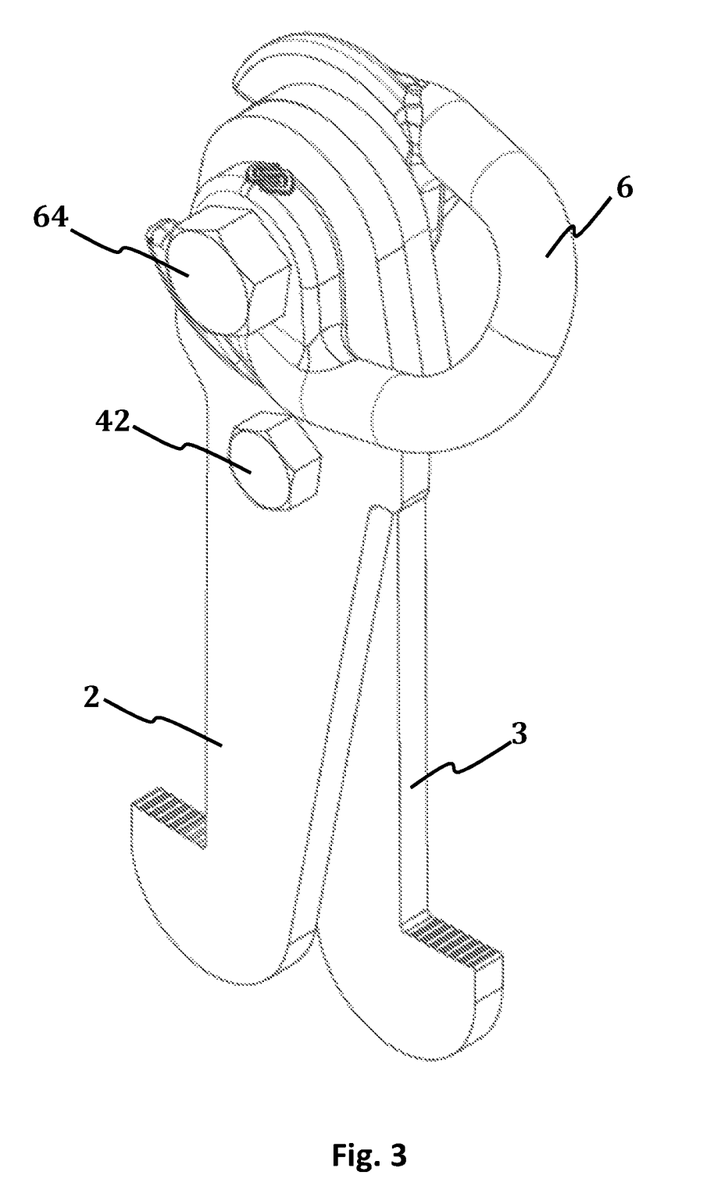
FIG. 3 shows in perspective the securing element in the securing configuration, with the shafts of the hooks forming an angle and the rotating shackle.
Figure 4:
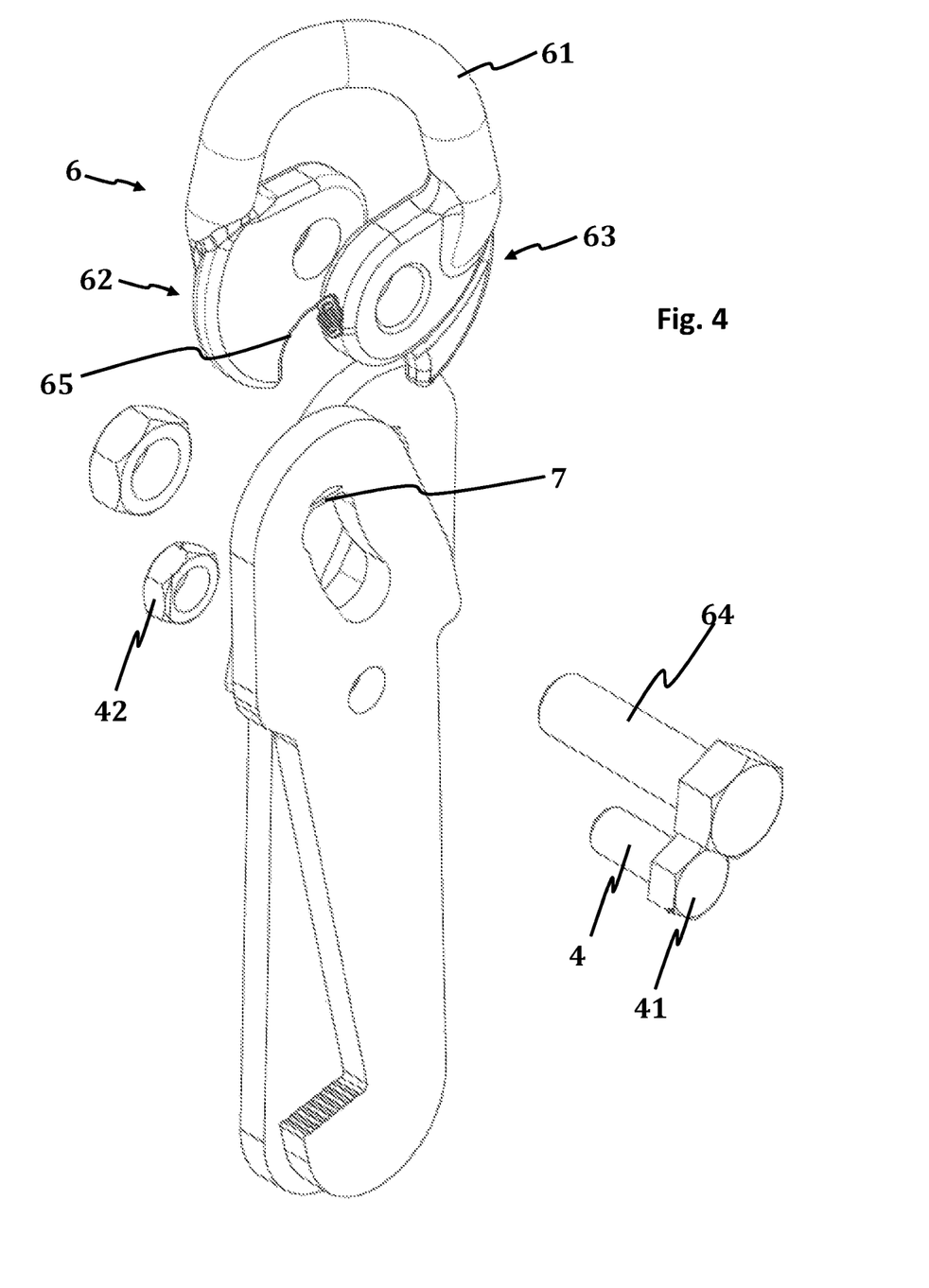
FIG. 4 shows the securing element in exploded view.
Figure 5:
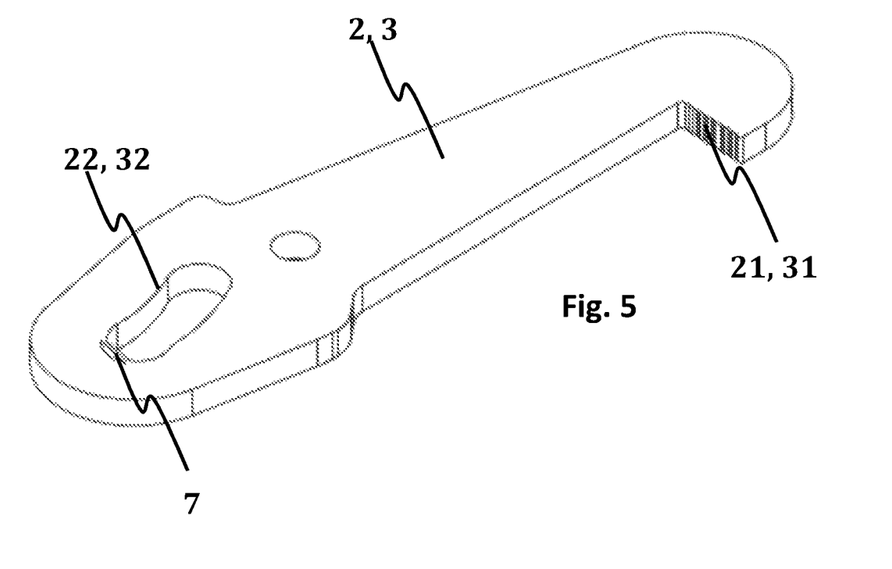
FIG. 5 shows in perspective one of the hooks.
Figure 6:
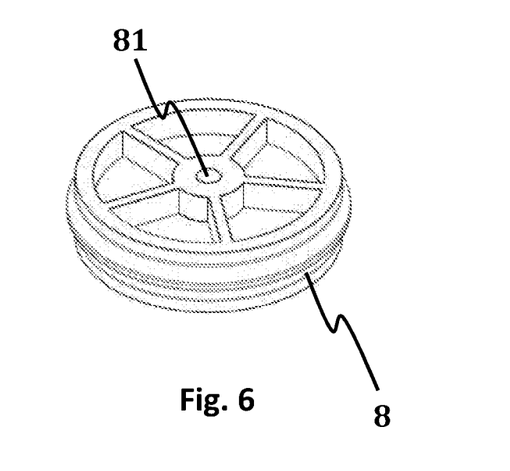
FIG. 6 shows in perspective the positioning disc.
Figure 7:
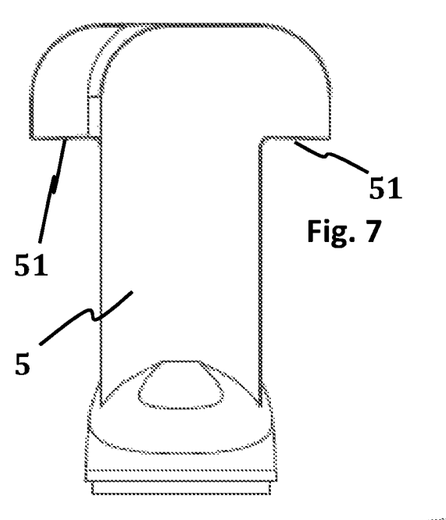
FIGS. 7 to 11 are various views of the case.
Figure 8:
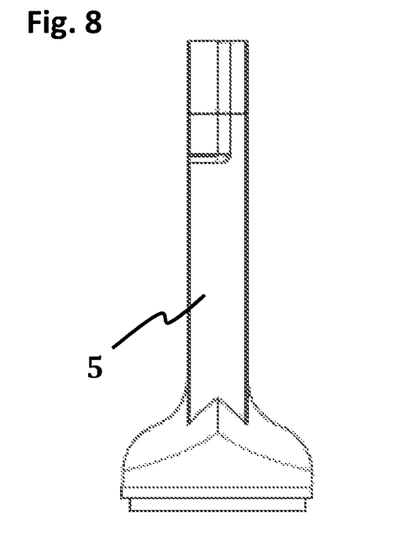
Figure 9:
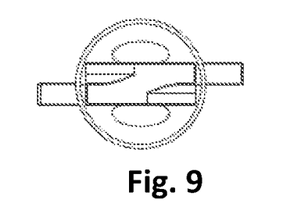

The key 64, as can be seen in FIG. 3, is inserted in the slots 22, 32.

The ends 41, 42 of the shaft 4 protrude laterally, and the ring ends 62, 63 are provided with a housing 65 with a complementary shape of the ends 41, 42 of the shaft 4, so that in the insertion configuration, each of the ends 41, 42 of the shaft 4 is inserted into a housing 65.

It is pointed out that in some embodiments, the housing can be designed to receive an angular sector of the smallest end of the key, provided that it allows a support and a locking of the ring end with regard to the hook. The essential thing is that there is a support surface that prevents the rotation of the ring in each of the directions.

Figure 10:
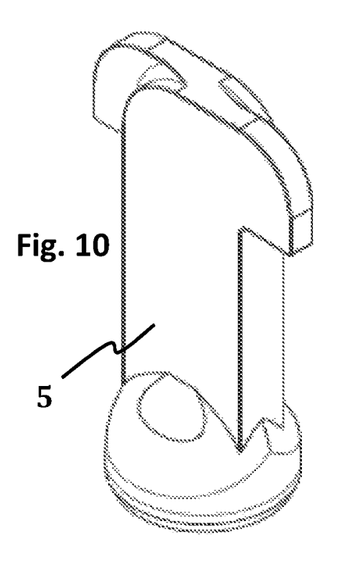
Figure 11:
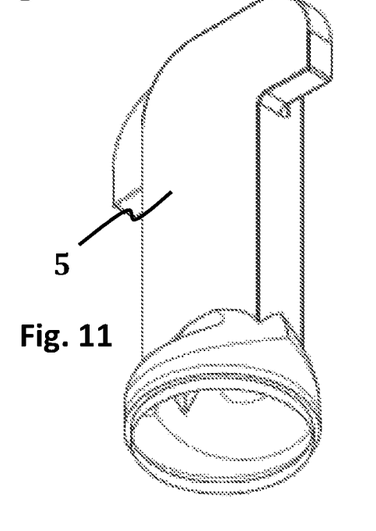

The ends of the slots 22, 32 furthest from the shaft 4 are provided on their inner surface with a frangible element 7, which may be a tab joined at its ends to the internal walls of the end of the slot 22, 32, as shown in FIG. 1, or a projecting attachment disposed at the end of the slot 22, 32, as described in FIG. 10.

It is noted that the frangible element 7, apart from an indicator, is an energy dissipater in the event of a fall. In particular, it can be designed so that its rupture involves a work, so that the requests caused by a sudden tension are staggered. In a first step, the frangible element is deformed, absorbing energy, when breaking also absorbs energy, and when the key rests on the end of the slot, the energy to be absorbed is lower.

The frangible element can optionally be associated to a sensor, in turn connected to a signal transmitter destined to a control center, which will allow emitting alarm signals due to falls or overloads.

The sensor can be embedded in the hole resulting from the presence of the frangible element. The sensor may comprise an RFID chip or similar device with small dimensions, which emits or receives a signal with a transponder device programmed to send SMS, acoustic and visual signal, and emergency call to 911 in case of communication interruption.

As shown in FIGS. 1 to 4, the ring 61 of the shackle 6 is disposed in an oblique plane to the general plane of the securing element 1, so that the joints between the ring 61 and the ring ends 62, 63 are made on an upper side of the key 64 on opposite sides thereof.

As shown in FIGS. 12 to 17, the invention also relates to a embeddable security anchor assembly of the type intended to be fixed to a wall or structural element E to form a secure point for hooking lifelines, safety harnesses, elements for lifting or securing loads and in general for the safe hold of any kind of load, the securing assembly being provided with an securing element 1 and a case 5 embedded in a structure E.

In FIGS. 6, 12 to 16, it can be seen that the assembly comprises a positioning disc 8. This positioning disc 8 is provided with first removable attachment means to the inner side of the formwork mold of the wall E, which in this case consists of a shape complementary to the mouth of the case 5, and with second removable attachment means to the case cover 5, which in this case consist of a hole 81 for the insertion of a screw, nail or the like.

As can be seen in FIGS. 7 to 11, the case 5 is elongated, its cross section is rectangular, its distal part comprises at least two side widening, its proximal part comprises an outer mouth complementary to the positioning disc 8 and third removable attachment means complementary to the second attachment means of the positioning disc 8.

Figure 12:
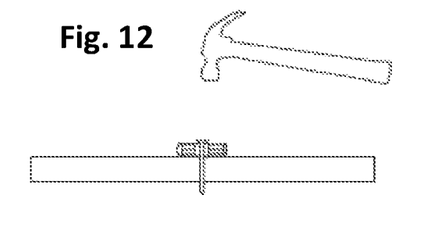
FIGS. 12 to 19 show the method of molding a wall element with the case, and subsequently of securing the securing element.

FIGS. 12 to 19 show the different steps of positioning the case, securing and using the embedded anchor:

FIG. 12: Positioning in the desired position of the positioning disc on the inner side mold for the pouring of the concrete.

Figure 13:
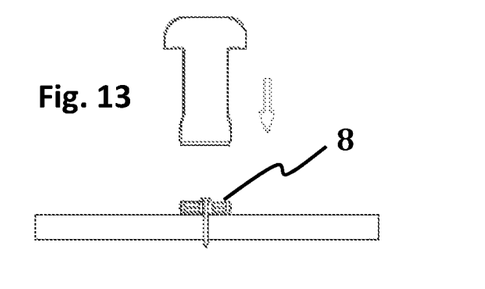

FIG. 13: Coupling of the hollow mold case 5 to the positioning disc.

Figure 14:
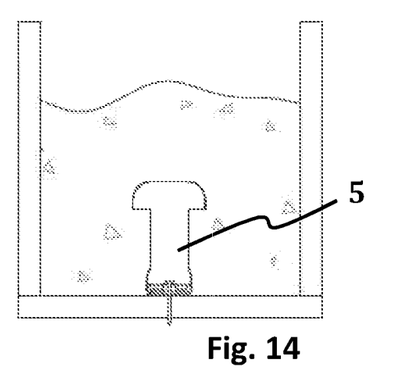
Figure 15:
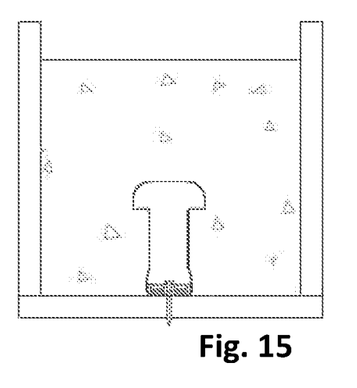
Figure 16:
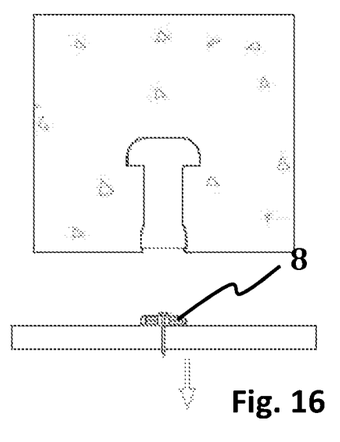

FIGS. 14 to 16: Pouring of the concrete removed from the mold.

FIG. 17: Introduction of the securing element 1 into the case 5.

FIG. 18: The inclined surface of the rear portion of the hooks 2, 3 when coming into contact with the wall E causes them to separate and the teeth 21, 31 to fit with the widening of the case 5.

FIG. 19: Coupling of a ring and loading of the securing mechanism.

It is pointed out that when the securing element is not inserted in the case 5, this can be covered with the positioning disc 8 to prevent dirt from entering it.

FIGS. 20 to 25 show an embodiment of the invention for the insertion of the securing element in a floor S. This embodiment is characterized by a longer length of the hooks, which are slimmer, with a pointed distal end, and with an arched hook surface.

In this text, the word "comprises" and its variants (such as "comprising", etc.) should not be interpreted in an exclusive manner, that is, they do not exclude the possibility that what is described includes other elements, steps, etc.

On the other hand, the invention is not limited to the specific embodiments that have been described but also embraces, for example, the variants that can be made by the average expert in the art (for example, as regards the choice of materials, dimensions, components, configuration, etc.), within what is clear from the claims.

The invention claimed is:

1. Scissor-type securing element (1), comprising two hooks pivotably connected together (2, 3) by a rotary shaft (4), a distal part being defined in each hook (2, 3) on one side of the shaft (4) and a proximal part being defined on the other side of the shaft (4), the distal parts being intended to be introduced in a case (5) embedded in a structure (E), each distal part being provided with a tooth (21, 31) and each proximal part being provided with a penetrating slot (22, 23), in which an insertion configuration (P1) is defined, in which the hooks (2, 3) are superposed and a securing configuration (P2) in which the teeth (21, 31) are in a more separated position and the hooks (2, 3) project so as to remain retained in an inner support surface (51) of the case (5), the slots (22, 32) being arranged so that in the insertion configuration the ends of the slots (22, 32) closest to the shaft (4) overlap and in the securing configuration the ends of the slots (22, 32) furthest from the shaft (4) overlap, in which the securing element (1) comprises a shackle (6), the shackle (6) being provided with a ring (61) for supporting the load, two ring ends (62, 63) and a key (64) supported by the two ends (62, 63) and inserted into the slots (22, 32), characterized in that the ends (41, 42) of the shaft (4) project laterally and the ring ends (62, 63) are provided with a housing (65) having a form complementary to the ends (41, 42) of the shaft (4), such that in the insertion configuration, each of the ends (41, 42) of the shaft (4) is inserted into a housing (65).

2. Element according to claim 1, wherein the ends of the slots (22, 32) furthest from the shaft (4) are provided on their inner surface with a frangible element (7).

3. Element according to claim 2, wherein the frangible member (7) is a tab attached at its ends to the internal walls of the slot end (22, 32) or a protruding attachment disposed at the end of the slot (22, 32).

4. Assembly according to claim 2, wherein the frangible element (7) has a sensor associated with it, which in turn is connected to a signal transmitter.

5. Assembly according to claim 4, wherein the sensor comprises an RFID chip.

6. Element according to claim 1, wherein the ring (61) of the shackle (6) is disposed in an oblique plane to the general plane of the securing element (1), so that the joints between the ring (61) and the ring ends (62, 63) are made on an upper side of the key (64) on opposite sides thereof.

7. Element according to claim 1, which is symmetrical with regards to its longitudinal direction.

8. Embeddable security anchor assembly of the type intended to be fixed to a wall or structural element (E) to form a secure point for hooking lifelines, safety harnesses, elements for lifting or securing loads and in general for the safe hold of any kind of load, the securing assembly being provided with an securing element (1) according to claim 1, and a case (5) embedded in a structure (E), characterized in that it comprises a positioning disk (8), the positioning disk (8) being provided with first removable attachment means to the inner side of the mold of the wall formwork (E) and with second removable attachment means to the case (5).

9. Assembly according to claim 8, wherein the case (5) is elongated, its cross section is rectangular, its distal part comprises at least two side widenings, its proximal part comprises an outer mouth complementary to the positioning disc (8) and third removable attachment means complementary to the second attachment means of the positioning disc (8).

10. Assembly according to claim 8, wherein each of the hooks comprises teeth at different levels, so that different securing levels are defined.

* * * * *